Sept. 10, 1935.   F. C. DILLENBACK   2,013,879
FOOD MOLD
Filed Dec. 3, 1934
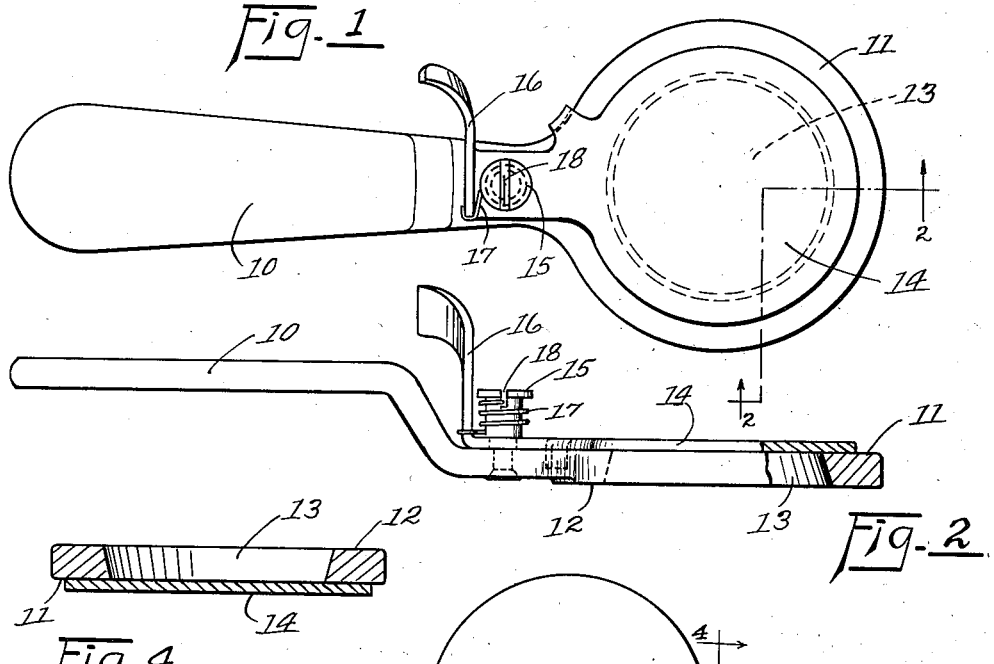
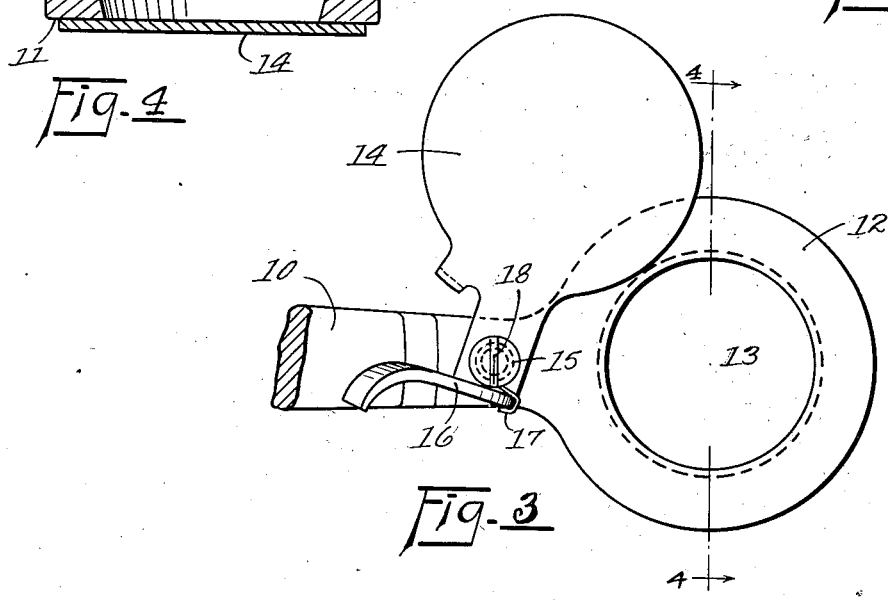
Witness:
Geo L. Chapel
Inventor
Frank C. Dillenback
By Rice and Rice
Attorneys Patented Sept. 10, 1935

2,013,879

UNITED STATES PATENT OFFICE 2,013,879

FOOD MOLD

Frank C. Dillenback, Grand Rapids, Mich.

Application December 3, 1934, Serial No. 755,665

8 Claims. (Cl. 107—19)

The instant invention relates to food molds and more particularly to molds for forming raw meat patties, cookie doughs and the like before they are placed in the oven or on a griddle for cooking.

The primary objects of the present invention are to provide a mold of the general character above indicated whereby raw meat patties, cookie doughs and the like may be readily and conveniently formed for cooking; to provide such a mold whereby raw meat patties, cookie doughs and the like may be made up in uniform size, shape and weight; and, to provide such a mold which is utilitarian in use, a mold which may be easily cleaned, and a mold which is economical in manufacture.

An illustrative embodiment of the invention is shown in the accompanying drawing, wherein:

Figure 1 is a top plan view of the food mold;

Figure 2 is a side elevational view thereof partly broken away on line 2—2 of Figure 1;

Figure 3 is a fragmentary top plan view showing the swingable cover swung to its lateral position; and Figure 4 is a fragmentary side elevational view of the mold.

Referring to the drawing in which like parts of the mold are designated by the same numerals in the several views, the device here shown is generally of paddle form with a handle portion 10 extending outwardly-upwardly-outwardly and a flat round portion having an upper plane surface 11 and a lower parallel surface 12. This flat round portion is provided with a downwardly-outwardly tapering circular opening 13 and a cover plate 14 for the opening is laterally swingably secured to the upper plane surface 11 in any suitable manner as by the pintle 15. The cover plate is here shown as provided with a laterally extending portion 16 adapted for engagement by the thumb of the user to more readily swing the cover plate from over the circular opening 13 and means for normally urging the cover plate to a position disposed over the opening is here shown as a helical spring 17 encircling the pintle 15, one end of which is secured to the cover extending portion 16 and the other end of which is secured to the slot 18 of the pintle 15.

In use the mold is turned upside down as shown in Figure 4. The circular opening is then packed with the raw meat, dough or the like which is leveled off parallel with the surface 12. Since the raw meat or dough will adhere to the surface of the inner side of the cover plate, the mold may then be turned right side up and the formed meat patty or cookie dough dropped on the griddle or in a pan by laterally swinging the cover plate 14 since the circular opening 13 is tapered.

It will thus be seen that raw meat patties, cookie doughs and the like may be readily and conveniently formed which are uniform in size, shape and weight and that the food mold is utilitarian in use, may be easily cleaned and is economical in manufacture.

While but one specific embodiment of this invention has been herein shown and described, it will be understood that numerous details of the construction shown may be altered or omitted without departing from the spirit of this invention as defined by the following claims.

I claim:

1. In a device of the class described, a flat plate having a downwardly-outwardly tapering circular opening therethrough, and a cover plate for said opening laterally swingably secured to the upper surface of said flat plate.

2. In a device of the class described, a flat plate having a downwardly-outwardly tapering circular opening therethrough, a cover plate for said opening laterally swingably secured to the upper surface of said flat plate, and means for normally urging said cover plate to a position disposed over said opening.

3. In a device of the class described, a flat plate provided with a handle portion and having a downwardly-outwardly tapering circular opening therethrough, and a cover plate for said opening laterally swingably secured to the upper surface of said flat plate.

4. In a device of the class described, a flat plate provided with a handle portion extending upwardly-outwardly and having a downwardly-outwardly tapering circular opening therethrough, and a cover plate for said opening laterally swingably secured to the upper surface of said flat plate.

5. In a device of the class described, a flat plate provided with a handle portion and having a downwardly-outwardly tapering circular opening therethrough, a cover plate for said opening laterally swingably secured to the upper surface of said flat plate, and means for normally urging said cover plate to a position disposed over said opening.

6. In a device of the class described, a flat plate provided with a handle portion extending upwardly-outwardly and having a downwardly-outwardly tapering circular opening therethrough, a cover plate for said opening laterally swingably secured to the upper surface of said flat plate, and means for normally urging said cover plate to a position disposed over said opening.

7. In a device of the class described, a flat plate having a downwardly-outwardly tapering circular opening therethrough, a cover plate for said opening laterally swingably secured to the upper surface of said flat plate, and means for laterally swinging said cover plate.

8. In a device of the class described, a flat plate having a downwardly-outwardly tapering circular opening therethrough, a cover plate for said opening laterally swingably secured to the upper surface of said flat plate, means for normally urging said cover plate to a position disposed over said opening, and means for laterally swinging said cover plate.

FRANK C. DILLENBACK.